United States Patent
Ben Yaakov et al.

(10) Patent No.: US 11,476,788 B1
(45) Date of Patent: Oct. 18, 2022

(54) OPTIMAL OPEN WINDINGS INVERTER FOR CONTROLLING THREE-PHASE AC MOTORS

(71) Applicant: IRP NEXUS GROUP LTD., Nes-Ziona (IL)

(72) Inventors: Shmuel Ben Yaakov, Tel-Yitzhak (IL); Paul Price, Nes-Ziona (IL)

(73) Assignee: IRP NEXUS GROUP LTD., Nes-Ziona (IL)

( * ) Notice: Subject to any disclaimer, the term of this patent is extended or adjusted under 35 U.S.C. 154(b) by 0 days.

(21) Appl. No.: 17/410,449

(22) Filed: Aug. 24, 2021

(51) Int. Cl.
*H02P 27/08* (2006.01)
*H02P 23/00* (2016.01)

(52) U.S. Cl.
CPC .......... *H02P 27/085* (2013.01); *H02P 23/009* (2013.01); *H02P 2209/11* (2013.01)

(58) Field of Classification Search
CPC ......... G11B 5/022; H02H 7/0838; H02P 7/04; H02P 6/085; H02P 2201/05; H02P 2209/11; H02P 27/085
USPC ................... 318/503, 400.26, 400.29, 254.2
See application file for complete search history.

(56) References Cited

U.S. PATENT DOCUMENTS

| | | | | |
|---|---|---|---|---|
| 2004/0257018 A1* | 12/2004 | Tobias | ................. | B62D 5/0484 318/400.29 |
| 2005/0135474 A1* | 6/2005 | Atmur | ..................... | H02P 6/085 375/238 |
| 2020/0328704 A1* | 10/2020 | Ikegaya | ..................... | H02P 5/68 |

FOREIGN PATENT DOCUMENTS

| | | | | |
|---|---|---|---|---|
| JP | 2012090509 A | * | 5/2012 | |
| WO | WO-2017127557 A1 | * | 7/2017 | .......... B60L 15/2009 |

* cited by examiner

*Primary Examiner* — Jorge L Carrasquillo
(74) *Attorney, Agent, or Firm* — Roach Brown McCarthy & Gruber, P.C.; Kevin D. McCarthy

(57) ABSTRACT

Circuitry for efficiently operating a three-phase AC motor having three coils, each of which implementing a corresponding phase, comprising four half-bridge inverters having a common bus voltage, for controlling the level and the phase of input voltages supplied to the coils and a control circuitry for operating the four half bridges. A first coil of the motor is being connected between a first half-bridge inverter and a second half-bridge inverter and generating by the control circuitry a desired voltage across the first coil using the first and second half-bridge inverters; A second coil of the motor is being connected between the second half-bridge inverter and a third half-bridge inverter and generating by the control circuitry a desired voltage across the second coil using the second and third half-bridge inverters; A third coil of the motor is being connected between the third half-bridge inverter and a fourth half-bridge inverter and generating by the control circuitry desired voltage across the third coil using the third and fourth half-bridge inverters. The control circuitry, controls the phase of the voltage generated by the fourth half-bridge inverter to be equal to the phase of the voltage generated by the first half-bridge inverter.

20 Claims, 4 Drawing Sheets

OPTIMAL OPEN WINDINGS INVERTER FOR CONTROLLING THREE-PHASE AC MOTORS

FIELD OF THE INVENTION

The present invention relates to the field of AC motors. More particularly, the invention relates to a method and circuitry for efficiently operating inverters of three-phase AC motors, using a hardware efficient combination of half-bridge circuitry.

BACKGROUND OF THE INVENTION

Three-phase AC motors are widely used in industry and electrical mobility technology and are the driving force of many mechanical and electromechanical systems, due to their relative simplicity, proven reliability, and long service life. Three-phase motors of the very many kinds (synchronous, permanent magnetic, and the like) are one example of a machinery, that operates using the principles of electromagnetic induction.

AC motors use alternating current to generate a wide range of mechanical output power. AC motor controllers electrically regulate the speed and torque of AC motors since they have an adjustable output, that allows the motor speed and current, which affects the torque, to be precisely controlled. The speed of an AC motor is controlled by its AC supply frequency, as the alternating current in its stator coils generates a Rotating Magnetic Field (RMF) electromagnetically which interacts with the magnetic field of the rotor, and by that, produces output rotation. AC motor controllers (or "motor drives") alter the frequency and voltage amplitude supplied to the motor and allow users to control the frequency and current, and therefore, the resulting speed and torque of the motor. These drives (often called inverters) allow speed and torque control by converting a DC source to an AC current to drive the stator. This way, the AC current can be set to any desired magnitude and frequency, which changes the effective motor speed and torque.

The motor assembly is fed by a DC bus that in turn is connected to a power line via a rectifier, to a battery, or another power source. The inverter chops the DC voltage by power switches at a high switching frequency, to create an AC voltage which is fed to the stator. Pulse width modulator circuits (PWMs) are a popular method to chop the DC voltage, such that the average voltage of the resulting signal is the required AC voltage waveform.

FIG. 1A (prior art) shows the connection of a three phase inverter 101, comprising three half bridges 102-104, to an AC motor with coils that are connected in a "star" arrangement (also called "Y" arrangement). In this arrangement, if the bus voltage of the inverter is $+V_B$, the peak voltage across each coil (Line to Neutral $V_{LN}$) can reach the value $V_{LN}=0.5\ V_B$.

FIG. 1B (prior art) shows the connection of a half-bridge inverter 101 to an AC motor with coils that are connected in a triangular (or Delta) arrangement. In this case, if the bus voltage used by the inverter is $+V_B$, the peak voltage across each coil will be $V_{LL}=V_B\ 2/\sqrt{3}=0.86V_B$. However, in this case, if the voltages across all coils are not balanced, there will be a circulating current. Since this circulating current is not in-phase with the voltages of each phase, the result will be more losses. Therefore, the triangular arrangement is not chosen for most applications.

Another connection that is used is called "separated phase drive" (or 'open windings') and is shown in FIG. 2A (prior art) for one phase. In this connection, instead of using a single three phase inverter, each coil has a separate full-bridge inverter. FIG. 2B (prior art) shows the average voltages $V_{a1}$, $V_{a2}$ developed across each full-bridge implementing a separated phase drive, shown in FIG. 2A, and the voltage $V_a$ developed across the coil a. It can be seen that the amplitude of the voltages $V_{a1}$, $V_{a2}$ has a peak value of $V_B$, while the peak-to-peak value of the voltage $V_a$ is $2V_B$. In this implementation, the peak voltage will be equal to the bus voltage $V_B$. However, this solution is more costly, since it requires three full bridges (six half bridges), rather than three half-bridges, as in the Y or Delta connections.

FIG. 3A (prior art) shows the connection of an open winding inverter and the voltages of the half bridges mid-points $V_{a1}$, $V_{a2}$ and $V_a$. FIG. 3B depicts the time domain voltage of each of the stator coils, for the connection shown in FIG. 3A. Since the voltages $V_{a1}$ and $V_{b1}$ and $V_{c1}$ ranges between 0 to $V_B$, consequently $V_a$, $V_b$, $V_c$, ranges between $-V_B$ to $+V_B$.

It is therefore an object of the present invention to provide a method and circuitry for three phase inverter that produces a high output voltage by in a way that saves hardware.

It is another object of the present invention to provide a method and circuitry for operating three-phase AC motors using inverters, which is capable of providing a maximum voltage that could reach up to 86.66% of the bus voltage of the inverter.

It is a further object of the present invention to provide a method and circuitry for operating three-phase AC motors, which eliminates the flow of circulating current through the coils of the motor.

Other objects and advantages of the invention will become apparent as the description proceeds.

SUMMARY OF THE INVENTION

A method for efficiently operating a three-phase AC motor, comprising:
a) providing an AC motor having three coils, each of which implementing a corresponding phase;
b) providing four half-bridge inverters having a common bus voltage $V_B$, for controlling the level and the phase of input voltages supplied to the coils;
c) providing a control circuitry, such as a microprocessor, for operating the four half bridges;
d) connecting a first coil of the motor between a first half-bridge inverter and a second half-bridge inverter and generating by the control circuitry a desired voltage across the first coil using the first and second half-bridge inverters;
e) connecting a second coil of the motor between the second half-bridge inverter and a third half-bridge inverter and generating by the control circuitry a desired voltage across the second coil using the second and third half-bridge inverters;
f) connecting a third coil of the motor between the third half-bridge inverter and a fourth half-bridge inverter and generating by the control circuitry desired voltage across the third coil using the third and fourth half-bridge inverters; and
g) controlling, by the control circuitry, the phase of the voltage generated by the fourth half-bridge inverter to be equal to the phase of the voltage generated by the first half-bridge inverter.

The phase shift between the first and second generated voltages and between the second and third generated voltages may be 120°.

The control circuitry may separately control the operation of the half-bridge inverters using an open-loop drive.

The control circuitry may separately control the operation of the half-bridge inverters using a closed-loop drive.

The control circuitry may control the operation of the half-bridge inverters based on current control of each coil.

Whenever the operation of the half-bridge inverters is based on current control of each coil, the method comprises the steps of:
  a) controlling the first and the second half bridges (HB1, HB2) to cause the current $I_a$ flowing through the first coil to have a sinusoidal form with the desired amplitude and phase $\varphi_a$, which is taken as a reference;
  b) controlling the second half-bridge (HB2) with respect to the first half bridge (HB1) to cause the current $I_b$ flowing through the second coil to have a sinusoidal form with the desired amplitude and phase $\varphi_b=\varphi_a+120°$,
  c) controlling the third half-bridge (HB3) with respect to the second half bridge (HB2) to cause the current $I_c$ flowing through the third coil to have a sinusoidal form with the desired amplitude and phase $\varphi_c=\varphi_b+120°$;
  d) controlling the fourth half-bridge (HB4) with respect to the third half bridge (HB3) to cause the phase $\varphi_c$ to be equal to $\varphi_a$,
wherein the control circuitry generates PWM for each half-bridge (HB1, ..., HB4) with the required duty cycle that corresponds to the desired current that flows through each coil.

Any of the phases may be selected as the reference, and the microcontroller will be programmed to control the PWM and provide the right phase with respect to the selected reference.

The modulation may be according to a selected drive waveform method.

The phase shifts may be adjusted to obtain field weakening.

Circuitry for efficiently operating a three-phase AC motor having three coils, each of which implementing a corresponding phase, comprising:
  a) four half-bridge inverters having a common bus voltage $V_B$, for controlling the level and the phase of input voltages supplied to the coils;
  b) a control circuitry for operating the four half bridges; wherein:
  c) a first coil of the motor is being connected between a first half-bridge inverter and a second half-bridge inverter and generating by the control circuitry a desired voltage across the first coil using the first and second half-bridge inverters;
  d) a second coil of the motor is being connected between the second half-bridge inverter and a third half-bridge inverter and generating by the control circuitry a desired voltage across the second coil using the second and third half-bridge inverters;
  e) a third coil of the motor is being connected between the third half-bridge inverter and a fourth half-bridge inverter and generating by the control circuitry desired voltage across the third coil using the third and fourth half-bridge inverters; and
  f) the control circuitry, controls the phase of the voltage generated by the fourth half-bridge inverter to be equal to the phase of the voltage generated by the first half-bridge inverter.

Circuitry for efficiently operating a three-phase AC motor having three coils, having a control circuitry to control the operation of the half-bridge inverters based on current control of each coil, in which:
  a) the first and the second half bridges (HB1, HB2) are controlled to cause the current $I_a$ flowing through the first coil to have a sinusoidal form with the desired amplitude and phase $\varphi_a$, which is taken as a reference;
  b) the second half-bridge (HB2) is controlled with respect to the first half bridge (HB1) to cause the current Tb flowing through the second coil to have a sinusoidal form with the desired amplitude and phase $\varphi_b=\varphi_a+120°$,
  c) the third half-bridge (HB3) is controlled with respect to the second half bridge (HB2) to cause the current $I_c$ flowing through the third coil to have a sinusoidal form with the desired amplitude and phase $\varphi_c=\varphi_b+120°$;
  d) the fourth half-bridge (HB4) is controlled with respect to the third half bridge (HB3) to cause the phase $\varphi_c$ to be equal to $\varphi_a$,
wherein the control circuitry generates PWM for each half-bridge (HB1, ..., HB4) with the required duty cycle that corresponds to the desired current that flows through each coil.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE PRESENT INVENTION

The present invention provides circuitry for operating (driving) three-phase AC motors with minimal hardware that is based on a combination of a full-bridge inverter and half-bridge inverters, which is capable of allowing independently controlling the voltage across each coil with a peak value that is greater than the peak value of the "star" arrangement, while eliminating unwanted circulating current that flows in the "triangular" arrangement. The circuitry is capable of providing a maximum voltage that reaches up to 86.66% of the bus voltage of the inverters and eliminates the flow of circulating current through the coils of the motor. The circuitry has an independent control on the magnitude and phase of the current flowing in each coil (or phase of the motor). The drive circuitry can be implemented with an open loop or closed loop control.

Figure 1A:
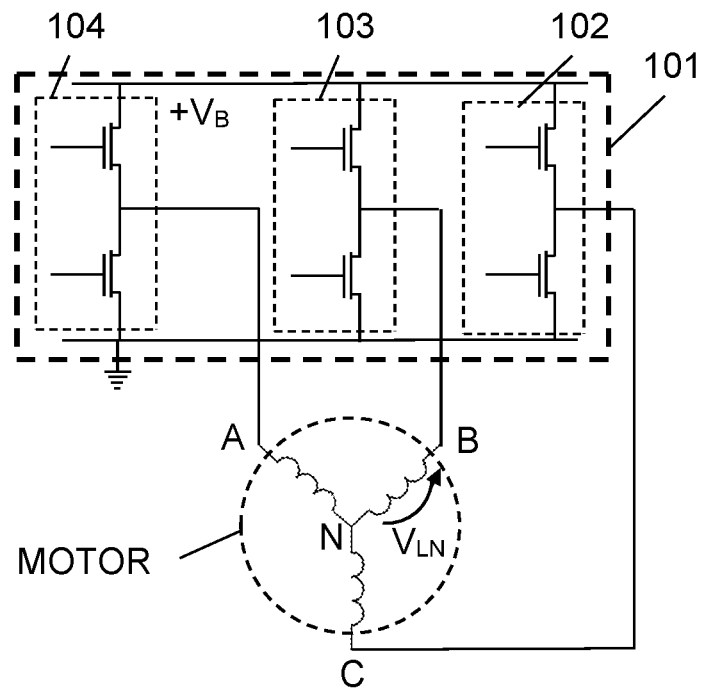
FIG. 1A (prior art) shows the connection of a half-bridge inverter to an AC motor with coils that are connected in a "star" arrangement.
Figure 1B:
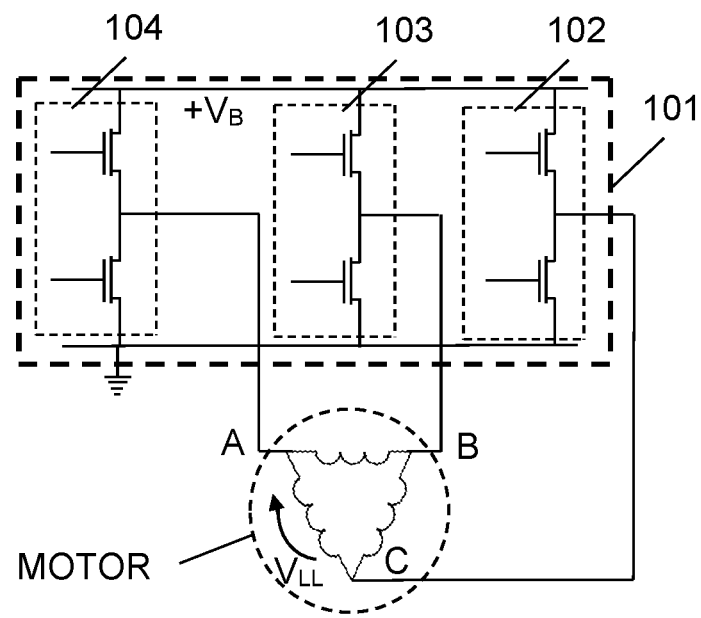
FIG. 1B (prior art) shows the connection of a half-bridge inverter to an AC motor with coils that are connected in a triangular (Delta) arrangement.
Figure 2A:
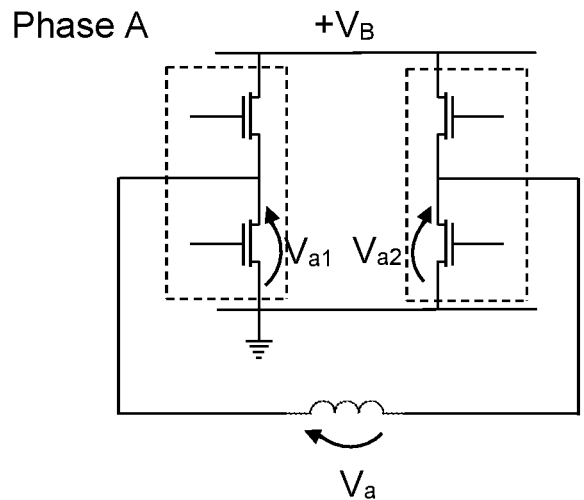
FIG. 2A (prior art) shows a separated phase drive (or open winding) connection, illustrated for one phase.
Figure 2B:
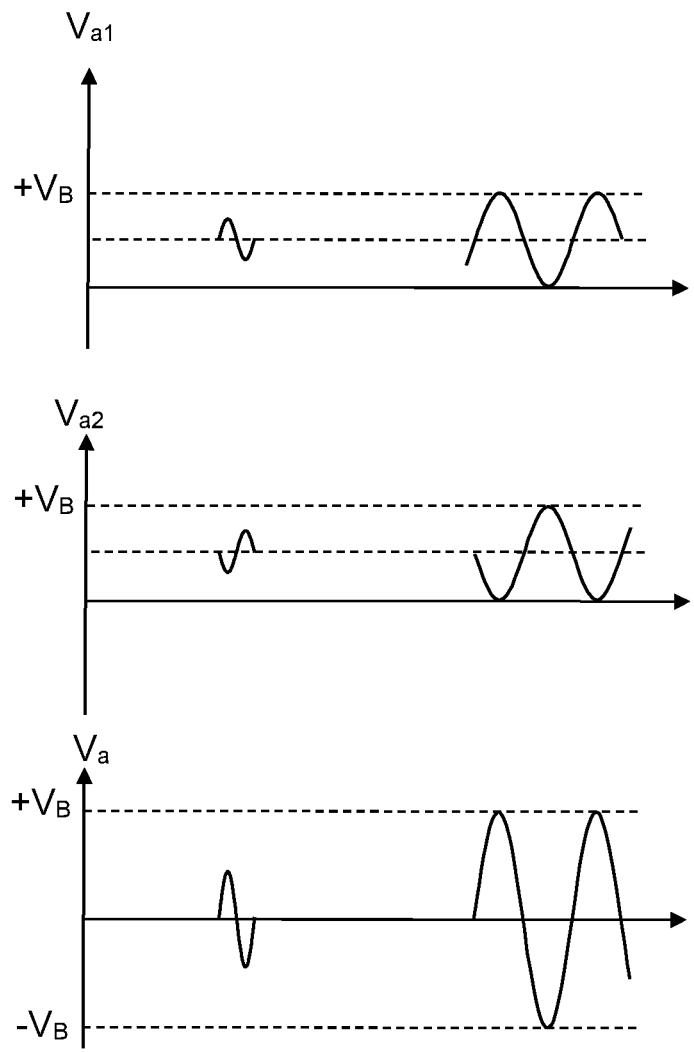
FIG. 2B (prior art) shows the average voltages developed across each full-bridge implementing a separated phase drive shown in FIG. 2A.
Figure 3A:
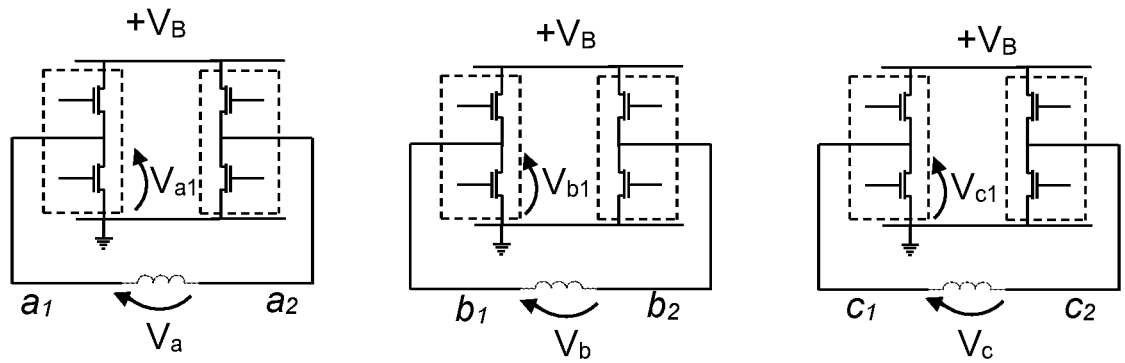
FIG. 3A (prior art) shows an open winding three phase inverter.
Figure 3B:
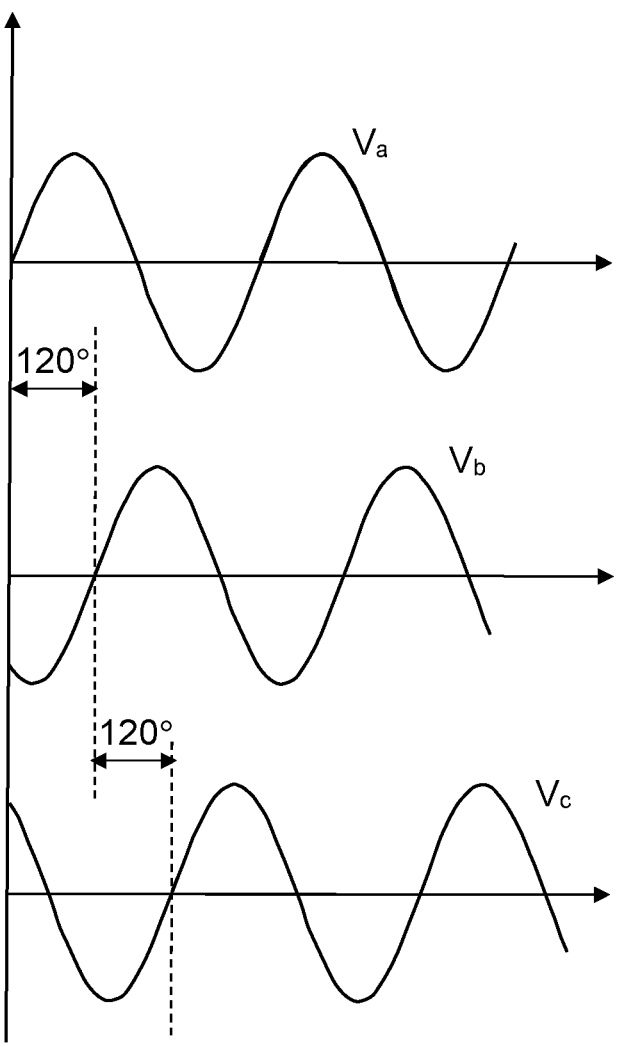
FIG. 3B (prior art) shows the stator's coils waveform produced by an open winding inverter of FIG. 3A.

FIG. 3A (prior art) shows a separated phase drive configuration using a separate full-bridge inverter to each coil, that is, six half bridges. In this case, the peak value of voltages $V_a$, $V_b$ and $V_c$ across the three coils is $V_B$, and the phase-shift between the three voltages is 120° (FIG. 3B). A control circuitry (or controller) such as a microprocessor (not shown) controls the PWM signal of each of the separate full-bridge inverters to generate the three phase motor drive voltage (such as a sine-wave, which is the average value of the PWM). The control signal to each phase is delayed by ⅓ of the period (cycle) to realize a 120° shift between the phases. If for example, the phase at point $a_1$ is $\varphi=0°$), then since each half of each bridge operates in anti-phase with respect to the other half, the microprocessor will control the PWM signal to generate sine waves with phases $\varphi=180°$, $\varphi=120°$, $\varphi=-60°$, $\varphi=240°$, $\varphi=+60°$ at points $a_2$, $b_1$, $b_2$, $c_1$, $c_2$, respectively.

Figure 4:
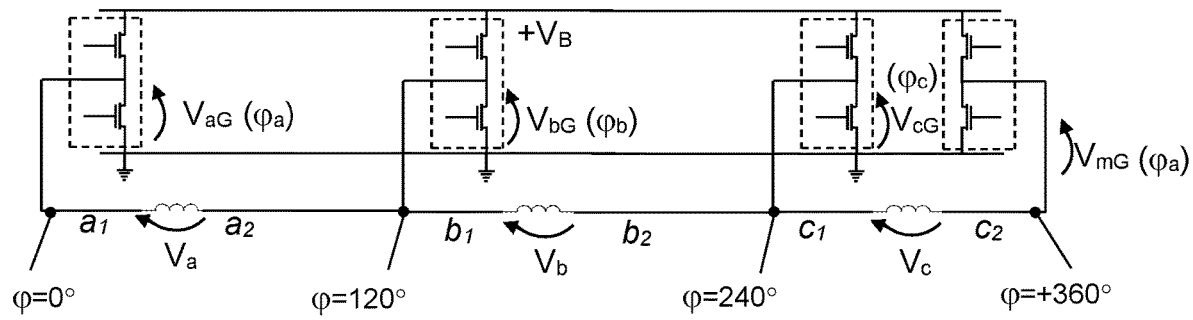
FIG. 4 shows a configuration, which uses an open-loop drive, according to an embodiment of the invention.

FIG. 4 shows a separated phase drive configuration using only four half-bridges inverter, according to an embodiment of the invention. Practically, this configuration requires 2 half bridges less than the prior art open winding topology and therefore, allows saving hardware. In addition, this configuration reduces power losses introduced by each transistor of the half-bridge inverters. For proper three phase operation, the phase shifts between point $a_1$ and $a_2(b_1)$, $b_1$ and $b_2(c_1)$, $c_1$ and $c_2$, is 120°. Also, the phase at point $a_1$ is controlled to be equal to the phase at point $c_2$. As a result, the phases across each of the stator coils (each of which implementing a corresponding phase) are shifted by 120° as required for a three phase drive. However, due to the fact that the phase shift across each coil is $\varphi=120°$ (rather than 180° as in the prior art open winding configuration) the peak voltage possible across each coil will be equal $0.866V_B$ (rather than to $V_B$ when phase-shift is 180°). On the other hand, two half-bridges are saved. Compared to the result of a "star" configuration (in which the peak voltage is $0.5V_B$), an improvement of 36.66% in voltage amplitude is obtained.

Figure 5:
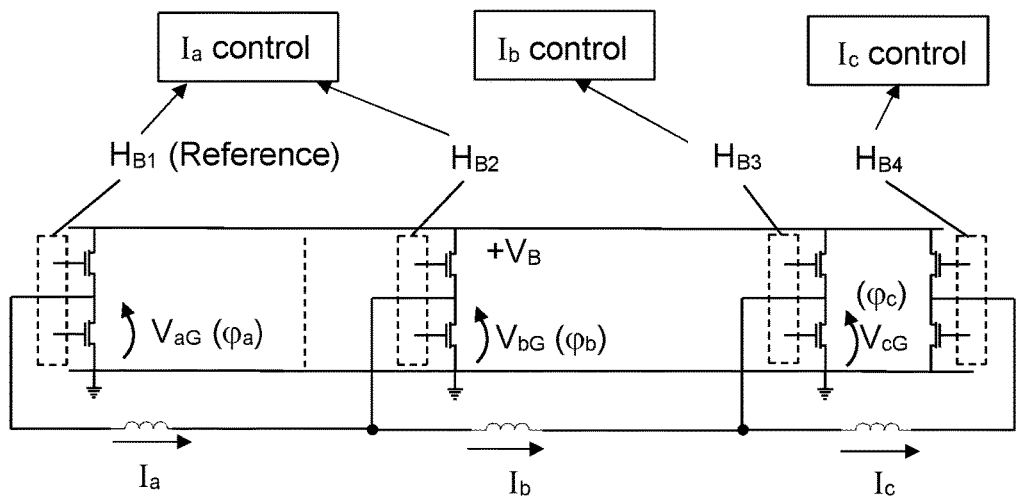
FIG. 5 shows a separated phase drive configuration using a closed-loop drive, according to an embodiment of the invention.

The configuration shown in FIG. 5, according to an embodiment of the invention, uses an open-loop drive. Each of the half bridges is driven independently, $V_{aG}$ with phase $\varphi_a$, $V_{bG}$ with phase $\varphi_b$ and $\varphi_{cG}$ with phase $\varphi_c$ and another half-bridge inverter with a drive voltage of $V_{mG}$ and phase $\varphi_a$. Hence, this open loop drive of the four half bridge inverters mimics the drive of prior three phase inverters.

FIG. 5 shows a separated phase drive configuration using a closed-loop drive, according to an embodiment of the invention. The closed-loop drive is based on the controlling of the current of each coil (rather than the voltage), since current control determines the torque of the motor, and is preferable from the aspect of stability.

In this example, at the first step, the first (leftmost) half-bridge (HB1) and the second half bridge (HB2) are controlled to cause the current $I_a$ flowing through coil a to have a sinusoidal form of the right (desired) amplitude provided by the reference signal of the feedback loop. The phase of the $I_a$ current ($\varphi_a$) is taken as a reference. At the next step, since the current $I_a$ is known (magnitude and phase), the third half-bridge (HB3) is controlled with respect to the second half bridge (HB2) to cause the current $I_b$ flowing through coil b to have a sinusoidal form with the desired amplitude and phase $\varphi_b=\varphi_a+120°$. At the next step, since the current $I_b$ is known, the fourth-bridge (HB4) is controlled with respect to the third half-bridge (HB3) to cause the current $I_c$ flowing through coil c to have a sinusoidal form with the desired amplitude and phase $\varphi_c=\varphi_b+120°$. A controller, such as a microprocessor (not shown) generates the PWM signal for each half-bridge (HB1, . . . , HB4) with the required duty cycle that corresponds to the desired current that flows through each coil. For example, in case when the motor is used to drive an electric car or a bicycle, and there is a need to increase the torque of the motor (as during acceleration) the microprocessor receives the command signal (by a throttle or other means). Then the microprocessor increases the reference signal of the desired current, measures the magnitude of the existing current and adjusts the duty cycle, until reaching the target current. Then the duty cycle will remain unchanged, until the command by a throttle or other means will change state. The maximum duty cycle will provide the maximum amplitude of the voltage across each coil and hence, the maximum current that flows through each coil.

Of course, any of the phases may be selected as the reference, and the microcontroller will be programmed to control the PWM and provide the right phase with respect to the selected as the reference.

Although embodiments of the invention have been described by way of illustration, it will be understood that the invention may be carried out with many variations, modifications, and adaptations, without exceeding the scope of the claims.

The invention claimed is:
1. A method for efficiently operating a three-phase AC motor, comprising:
 a) providing an AC motor having three coils, each of which implementing a corresponding phase;
 b) providing four half-bridge inverters having a common bus voltage VB, for controlling the level and the phase of input voltages supplied to said coils;
 c) providing a control circuitry for operating said four half bridges;
 d) connecting a first coil of said motor between a first half-bridge inverter and a second half-bridge inverter and generating by said control circuitry a desired voltage across said first coil using said first and second half-bridge inverters;
 e) connecting a second coil of said motor between said second half-bridge inverter and a third half-bridge inverter and generating by said control circuitry a desired voltage across said second coil using said second and third half-bridge inverters;
 f) connecting a third coil of said motor between said third half-bridge inverter and a fourth half-bridge inverter and generating by said control circuitry desired voltage across said third coil using said third and fourth half-bridge inverters;
 g) controlling, by said control circuitry, the phase of the voltage generated by said fourth half-bridge inverter to be equal to the phase of the voltage generated by said first half-bridge inverter;
 h) controlling the first and the second half bridges (HB1, HB2) to cause the current 1a flowing through the first coil to have a sinusoidal form with the desired amplitude and phase φa, which is taken as a reference;
 i) controlling the second half-bridge (HB2) with respect to the first half bridge (HB1) to cause the current Ib flowing through the second coil to have a sinusoidal form with the desired amplitude and phase φb=φa+120°;
 j) controlling the third half-bridge (HB3) with respect to the second half bridge (HB2) to cause the current Ic flowing through the third coil to have a sinusoidal form with the desired amplitude and phase $\varphi c=\varphi b+120°$;

k) controlling the fourth half-bridge (HB4) with respect to the third half bridge (HB3) to cause the phase $\varphi c$ to be equal to $\varphi a$, wherein the control circuitry generates PWM for each half-bridge (HB1, . . . , HB4) with the required duty cycle that corresponds to the desired current that flows through each coil.

2. A method according to claim 1, wherein the phase shift between the first and second generated voltages is 120°.

3. A method according to claim 1, wherein the phase shift between the second and third generated voltages is 120°.

4. A method according to claim 1, wherein the control circuitry separately controls the operation of the half-bridge inverters using an open-loop drive.

5. A method according claim 4, where in the modulation is according to a selected drive waveform method.

6. A method according to claim 1, wherein the control circuitry separately controls the operation of the half-bridge inverters using a closed-loop drive.

7. A method according to claim 6, wherein the control circuitry controls the operation of the half-bridge inverters based on current control of each coil.

8. A method according to claim 1, wherein any of the phases is selected as the reference, and the microcontroller will be programmed to control the PWM and provide the right phase with respect to the selected reference.

9. A method according to claim 1, wherein the phase shifts are adjusted to obtain field weakening.

10. A method according to claim 1, wherein the control circuitry is a microprocessor.

11. Circuitry for efficiently operating a three-phase AC motor having three coils, each of which implementing a corresponding phase, comprising:
   a) four half-bridge inverters having a common bus voltage VB, for controlling the level and the phase of input voltages supplied to said coils;
   b) a control circuitry for operating said four half bridges; wherein:
   c) a first coil of said motor is being connected between a first half-bridge inverter and a second half-bridge inverter and generating by said control circuitry a desired voltage across said first coil using said first and second half-bridge inverters;
   d) a second coil of said motor is being connected between said second half-bridge inverter and a third half-bridge inverter and generating by said control circuitry a desired voltage across said second coil using said second and third half-bridge inverters;
   e) a third coil of said motor is being connected between said third half-bridge inverter and a fourth half-bridge inverter and generating by said control circuitry desired voltage across said third coil using said third and fourth half-bridge inverters;
   f) said control circuitry, controls the phase of the voltage generated by said fourth half-bridge inverter to be equal to the phase of the voltage generated by said first half-bridge inverter
   g) the first and the second half bridges (HB1, HB2) are controlled to cause the current 1a flowing through the first coil to have a sinusoidal form with the desired amplitude and phase $\varphi a$, which is taken as a reference;
   h) the second half-bridge (HB2) is controlled with respect to the first half bridge (HB1) to cause the current Ib flowing through the second coil to have a sinusoidal form with the desired amplitude and phase $\varphi b=\varphi a+120°$;
   i) the third half-bridge (HB3) is controlled with respect to the second half bridge (HB2) to cause the current i, flowing through the third coil to have a sinusoidal form with the desired amplitude and phase $\varphi c=\varphi b+120°$;
   j) the fourth half-bridge (HB4) is controlled with respect to the third half bridge (HB3) to cause the phase $\varphi c$ to be equal to $\varphi a$;
   k) wherein the control circuitry generates PWM for each half-bridge (HB1, . . . , HB4) with the required duty cycle that corresponds to the desired current that flows through each coil.

12. Circuitry according to claim 11, in which the phase shift between the first and second generated voltages is 120°.

13. Circuitry according to claim 11, in which the phase shift between the second and third generated voltages is 120°.

14. Circuitry according to claim 11, in which the control circuitry separately controls the operation of the half-bridge inverters using an open-loop drive.

15. Circuitry according to claim 14, in which in the modulation is according to a selected drive waveform method.

16. Circuitry according to claim 11, in which the control circuitry separately controls the operation of the half-bridge inverters using a closed-loop drive.

17. Circuitry according to claim 16, in which the control circuitry controls the operation of the half-bridge inverters based on current control of each coil.

18. Circuitry according to claim 11, in which any of the phases is selected as the reference, and the microcontroller will be programmed to control the PWM and provide the right phase with respect to the selected reference.

19. Circuitry according to claim 11, in which the phase shifts are adjusted to obtain field weakening.

20. Circuitry according to claim 11, in which the control circuitry is a microprocessor.

* * * * *